United States Patent Office 3,840,536
Patented Oct. 8, 1974

---

3,840,536
4,5-DIALKYL-3,6-DISUBSTITUTED-2-MORPHOLINONE
George H. Douglas, Paoli, Daniel M. Teller, Devon, and Stanley C. Bell, Penn Valley, Pa., assignors to American Home Products Corporation, New York, N.Y.
No Drawing. Filed Dec. 3, 1971, Ser. No. 204,717
Int. Cl. C07d 87/34
U.S. Cl. 260—247.7 J    6 Claims

ABSTRACT OF THE DISCLOSURE

The 4,5 - dialkyl-3,6-disubstituted-2-morpholinone derivatives of this invention and their physiologically acceptable salts possess anti-inflammatory activity. The compounds are produced by condensing a substituted glyoxal with a 1-amino-2-alcohol at a temperature between about 20° C. to about 120° C.

BACKGROUND OF THE INVENTION

The reaction of 1-amino-2-alcohols with aldehydes and ketones to produce oxazolidine derivatives is known (Bergmann, Chem. Rev., 53, 309–352 (1953)). Generally the reaction proceeds smoothly at moderately elevated temperatures thusly:

$$R\overset{O}{\overset{\|}{C}}R^1 + R\overset{OH}{\overset{|}{C}H}-\overset{NHR}{\overset{|}{C}H}-R \xrightarrow{\Delta} R-C\overset{N-R}{\underset{O}{\overset{|}{R^1}}}\underset{R}{}$$

DESCRIPTION OF THE INVENTION

Surprisingly, it has now been discovered that the reaction of certain aldehydes with 1-amino-2-alcohols produces morpholin-2-one derivatives and that if oxazolidine products are formed in the reaction they may be thermally rearranged to yield the morpholin-2-one derivatives. The aldehydes which have been found to undergo reaction with 1-amino-2-alcohols to yield morpholin-2-one derivatives are those phenylglyoxal derivatives of formula (A), infra.

According to this invention, there is provided compounds of formula (I):

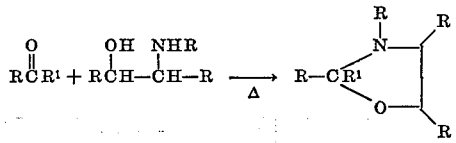

in which $R_1$ is selected from the group consisting of lower alkyl, phenyl and aralkyl groups of 7 to 10 carbon atoms; $R_2$ is selected from the group consisting of —H and lower alkyl; and X, Y and Z are independently selected from the group consisting of —H, lower alkyl, halo and lower alkoxy substituents, and physiologically acceptable salts thereof.

As an additional aspect of this invention, there is provided a process for the production of the compounds of formula (I), which comprises reacting a compound of formula (A)

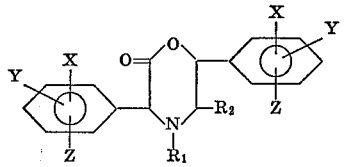

with a compound of formula (B)

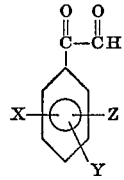

in which the groups $R_1$, $R_2$, X, Y, and Z are defined above at a temperature from about 20° C. to about 120° C.

In addition, this invention provides a process for rearranging acyl oxazolidine derivatives of formula (C)

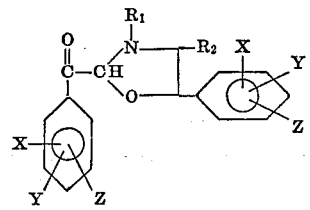

by heating the neat oxazolidine from a temperature in the range of 90° C. to about 120° C. Thus, the initial condensation reaction may be conducted at a relatively mild reaction temperature, cir. 50° C. to about 85° C., and the product may then be heated at an elevated temperature to rearrange the oxazolidine product to the morpholin-2-one derivative. Furthermore, the desired morpholin-2-one derivative may be formed directly by conducting the initial condensation reaction at an elevated temperature, ca. 100° C. to about 120° C. to cause rearrangement of the oxaxolidine ring to the morpholin-2-one ring during the reaction. In addition, if desired, the rearrangement from the oxazolidine nucleus to the morpholine ring may be conducted over an extended period of time by permitting the crude condensation product to stand under refrigeration at about 0° C. for from several days to several weeks, the crystalline morpholine derivative being formed in the crude reaction product.

Within the scope of the invention are the pharmaceutically acceptable salts of the compounds, of Formula I. Such salts may be prepared by techniques well known to those skilled in the art and included salts formed with acids such as hydrochloric, hydrobromic, sulfuric, nitric, phosphoric and the like. By the expression "lower alkyl" and "lower alkoxy" applicants intend to embrace groups containing 1 to 6 carbon atoms.

The compounds of the invention are pharmacologically active anti-inflammatory agents.

The compounds of this invention possess anti-inflammatory activity. To illustrate the anti-inflammatory activity of the claimed compounds, solutions were prepared by dissolving 3 milliliters of 4.1 percent serum albumin (Fraction V), 0.2 milliliters of 2 millimolar 5,5'-dithiobis-2-nitrobenzoic acid and several 3 milliliter samples at different concentrations of 4,5-dimethyl-3,6-diphenyl-2-morpholinone all dissolved in 0.1 molar potassium phosphate buffer (ph 7.4) to afford test solution concentrations of the anti-inflammatory agent, from a maximum of 1.0 millimolar to less than 0.3 millimolar. The solutions were incubated at 30° C. and the rate of reaction of albumin with the dithio-ether to form 5-thio-2-nitrobenzoic acid was determined colorimetrically (absorbance at 412 millimicrons) in ten minute intervals for 40 minutes. The increase in reaction rate resulting from the presence of the anti-inflammatory agent in comparison with the standard in the absence of the additive anti-inflammatory agent was determined. A minimum of 20 percent acceleration of the reaction at a maximum 1.0 millimolar concentration of the anti-inflammatory agent is considered representative of an active compound. The test results obtained for 4,5- dimethyl-3,6-diphenyl-2-morpholinone indicated that it was an active anti-inflammatory agent at concentrations as low as 0.3 millimolar.

EXAMPLE I l-ephedrine (35.0 g.) was dissolved in 600 ml. benzene and refluxed using a water separator until no more water came over (0.6 ml.). p-Toluene sulfonic acid (200 mg.) and phenylglyoxalhydrate (20.0 g.) were added, and refluxing continued. After 2 hours a further 6.3 ml. of water had come off, and the mixture was cooled and washed with bicarbonate solution and brine. Evaporation of the solvent gave a gum which eventually crystallized from isopropanol to give 4,5-dimethyl-3,6-diphenyl-2-morpholinone (7.7 g.), m.p. 146–150° C.

The hydrochloride was prepared by treatment of this material with gaseous HCl in ether, m.p. 194–197° C.

The infrared analysis identified the lactone absorption at 5.61μ.

Found for HCl salt: C, 67.94; H, 6.63; N, 4.24; Cl, 11.20. $C_{18}H_{20}ClNO_3$ requires: C, 68.03; H, 6.34; N, 4.41; Cl, 11.16.

EXAMPLE II

A mass of neat 2-benzoyl-3,4-dimethyl-5-phenyl oxazolidine was heated at 100° C. overnight to give a forty percent yield of 4,5-dimethyl-3,6-diphenyl-2-morpholinone.

EXAMPLE III

A mass of neat (p-chlorophenyl)(3,4 - dimethyl - 5-phenyl oxazolidinyl) ketone, when heated at 100° C. overnight afforded 3-p-chlorophenyl-4,5 - dimethyl - 6-phenyl-2-morpholinone.

Following the procedure of Examples II and III, the rearrangement of (p-anisyl)(3,4-dimethyl-5-phenyl oxazolidinyl) ketone and (3,4-dimethyl-5-phenyl oxazolidinyl) (p-tolyl) ketone into 3-p-anisyl-4,5-dimethyl-6-phenyl-2-morpholinone and 4,5-dimethyl-6-phenyl-3-p-tolyl-2-morpholinone, respectively, is effected.

What is claimed is:
1. A compound of the formula:

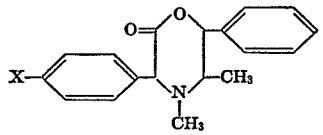

in which X is a member selected from the group consisting of —H, —Cl, —CH₃ and —OCH₃; and pharmaceutically acceptable salts thereof.

2. The compound of the formula:

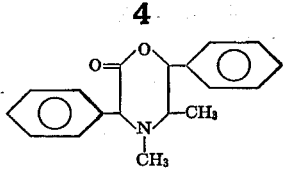

3. The compound which is 4,5-dimethyl-3,6-diphenyl-2-morpholinone hydrochloride.

4. The compound of the formula:

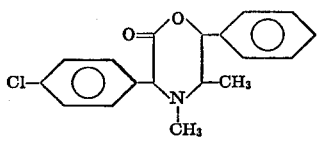

5. The compound of the formula:

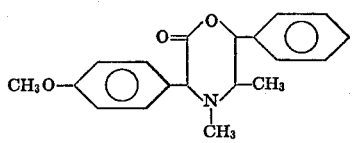

6. The compound of the formula:

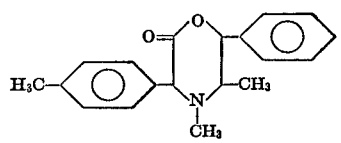

References Cited
UNITED STATES PATENTS

| | | | |
|---|---|---|---|
| 3,708,481 | 1/1973 | Hoffmann | 260—247.2 B |
| 3,324,123 | 6/1967 | Lenker | 260—247.7 J |
| 3,073,822 | 1/1963 | Schultz et al. | 260—247.7 J |

FOREIGN PATENTS

| | | | |
|---|---|---|---|
| 812,044 | 4/1959 | Great Britain | 260—247.7 J |

JOSEPH A. NARCAVAGE, Primary Examiner

J. TOVAR, Assistant Examiner

U.S. Cl. X.R.
260—309.7; 424—248